(12) United States Patent
Ouyoung (10) Patent No.: US 6,880,565 B2
(45) Date of Patent: Apr. 19, 2005

(54) SHOWER BATH TAP VALVE ASSEMBLY (75) Inventor: Scott Ouyoung, Taichung (TW)

(73) Assignee: Globe Union Industrial Crop., Taichung (TW)

(*) Notice: Subject to any disclaimer, the term of this patent is extended or adjusted under 35 U.S.C. 154(b) by 94 days.

(21) Appl. No.: 10/347,341

(22) Filed: Jan. 21, 2003

(65) Prior Publication Data
US 2004/0140004 A1 Jul. 22, 2004

(51) Int. Cl.⁷ ............................................. F16K 11/06
(52) U.S. Cl. ..................... 137/98; 137/100; 137/454.6; 137/597; 137/625.17
(58) Field of Search .................. 137/98, 100, 454.6, 137/597, 625.17

(56) References Cited

U.S. PATENT DOCUMENTS

| | | | | |
|---|---|---|---|---|
| 5,355,906 A | * | 10/1994 | Marty et al. | 137/98 |
| 5,732,729 A | * | 3/1998 | Shieh | 137/100 |
| 6,095,176 A | * | 8/2000 | Yang | 137/98 |
| 6,267,134 B1 | * | 7/2001 | Chen | 137/98 |
| 6,546,948 B1 | * | 4/2003 | Tarzia | 137/98 |

* cited by examiner

Primary Examiner—Stephen M. Hepperle
(74) Attorney, Agent, or Firm—Leong C. Lei (57) ABSTRACT

A shower bath tap valve assembly allowing easy production and assembly and adaptable also to a ceramic cartridge is essentially comprised of a valve body, a cylindrical balance valve seat to accommodate a balance valve to be forthwith placed in a central trough, connected to a cartridge and secured in position with a sleeve and a fixation nut.

1 Claim, 9 Drawing Sheets

SHOWER BATH TAP VALVE ASSEMBLY

BACKGROUND OF THE INVENTION (a) Field of the Invention

The present invention is related to a shower bath tap valve assembly, and more particularly, to one that is firmly secured in balance, allows easier production and assembly, and can be adapted to a ceramic or a general cartridge.

(b) Description of the Prior Art

Figure 1:
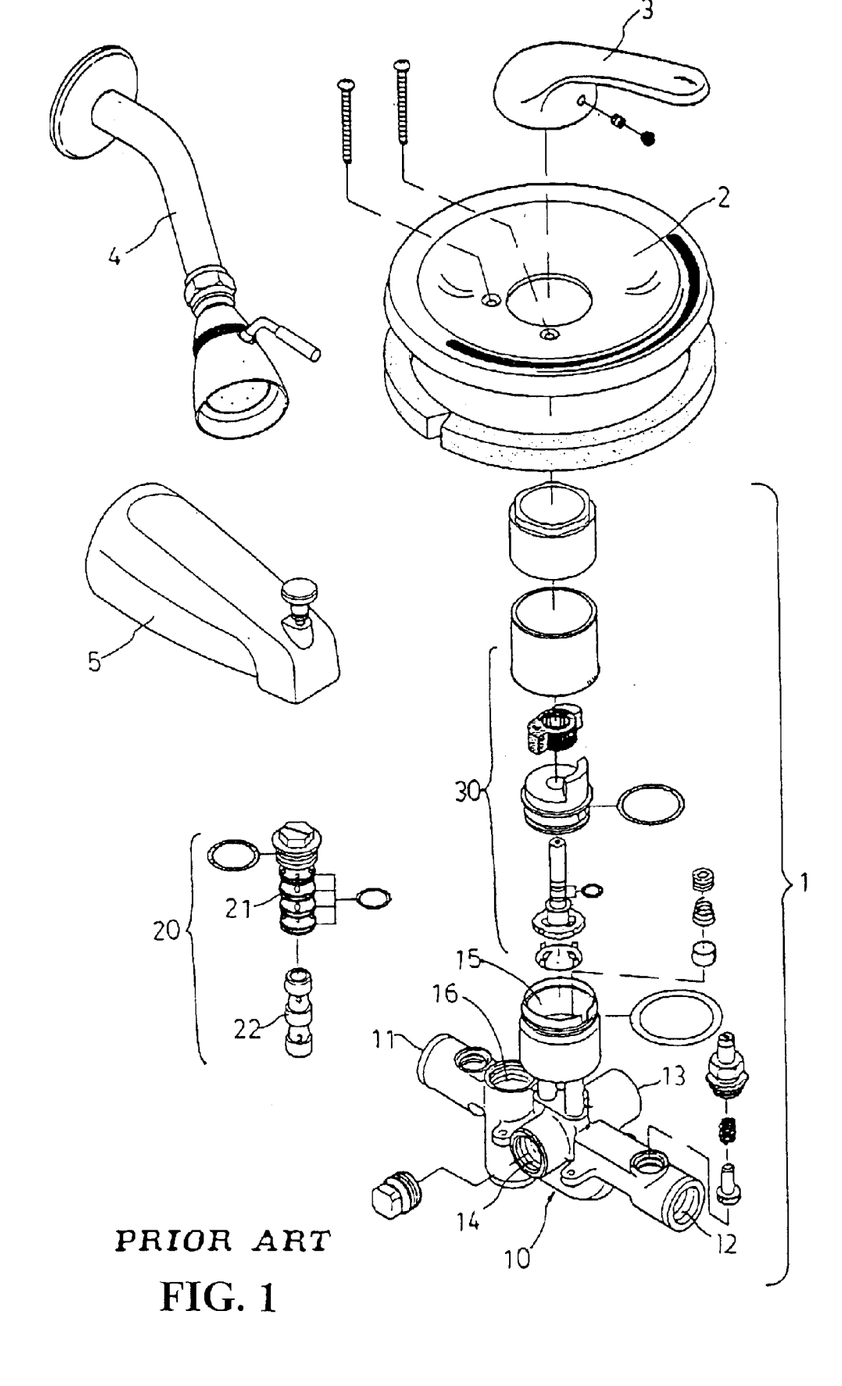
FIG. 1 is an exploded view of the prior art of the present invention.
Figure 2:
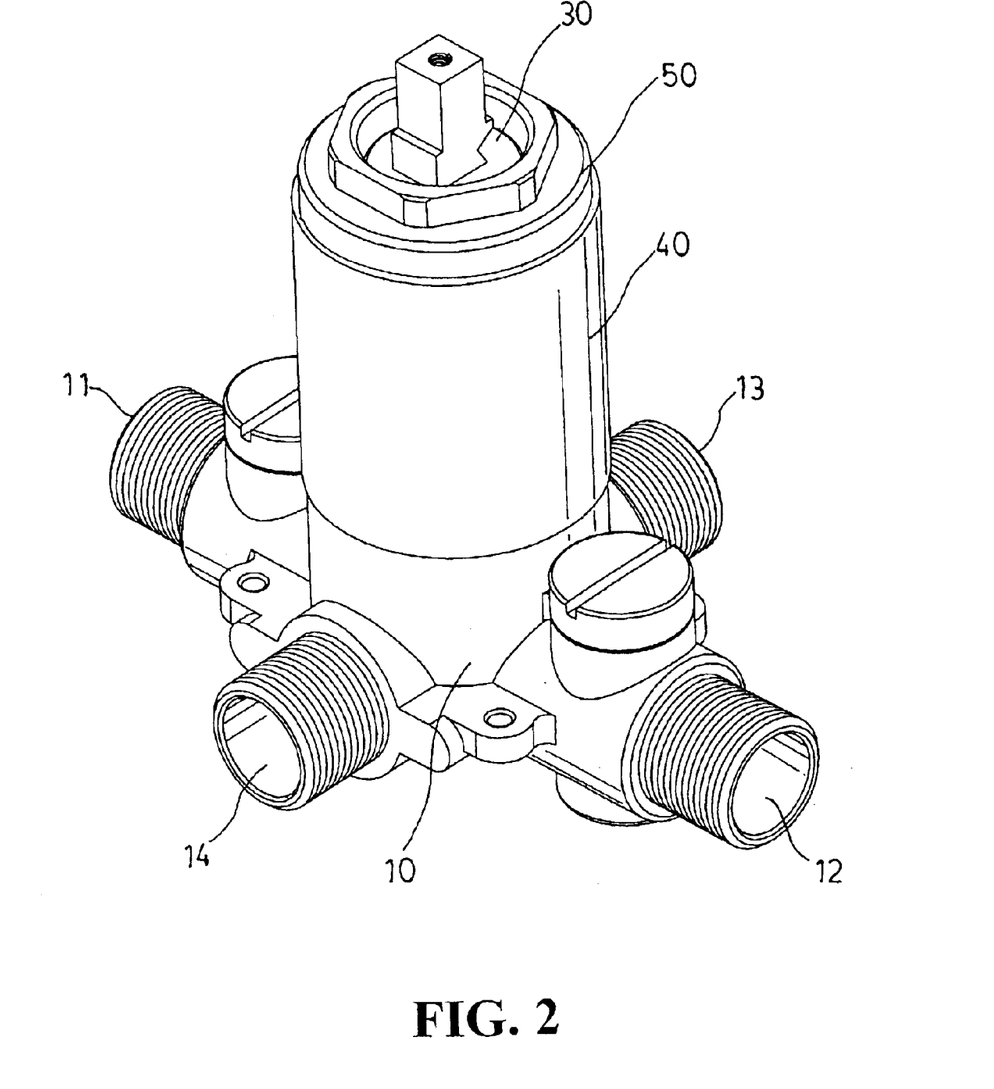
FIG. 2 is a view showing an assembly of a preferred embodiment of the present invention.

A shower bath tap in the present invention relates to a fixed tap in configuration as illustrated in FIG. 1 of the accompanying drawings. Wherein, a valve assembly 1 is mounted to a disk shape base 2; a handle 3 provided on the base 2 connects a cartridge of the valve assembly to control water amount delivered; a cold water inlet 11, a hot water inlet 12, a water outlet 13, a drain 14, a trough 15 to accommodate the cartridge, and another trough 16 to accommodate a balance valve are provided on the valve body; the water outlet 13 is connected to a diverter (not illustrated); and the valve assembly 1 is then provided with the pipe work to connect through a shower head 4 and a bathtub tap 5.

Figure 3:
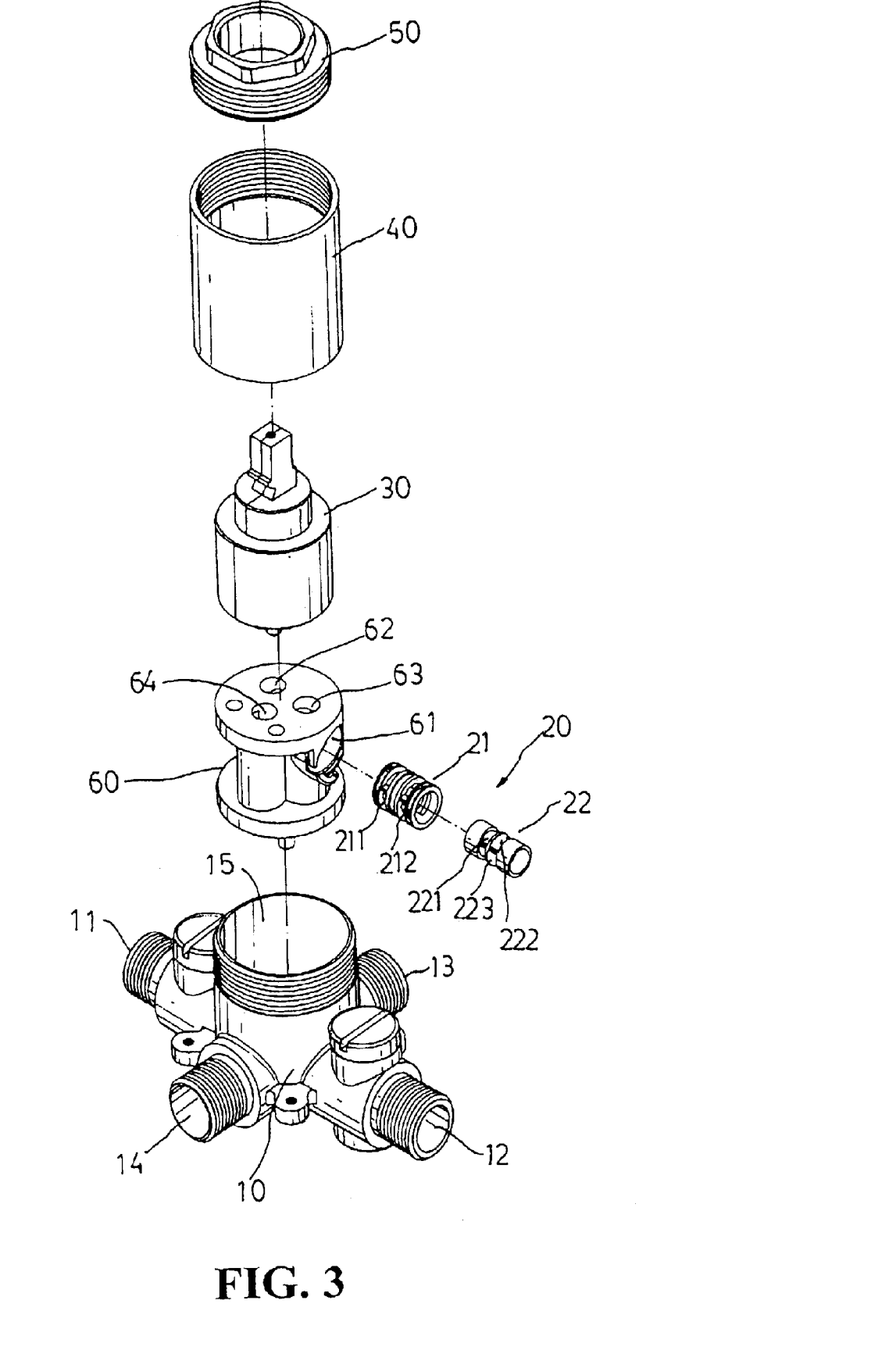
FIG. 3 is an exploded view of the preferred embodiment of the present invention.
Figure 4:
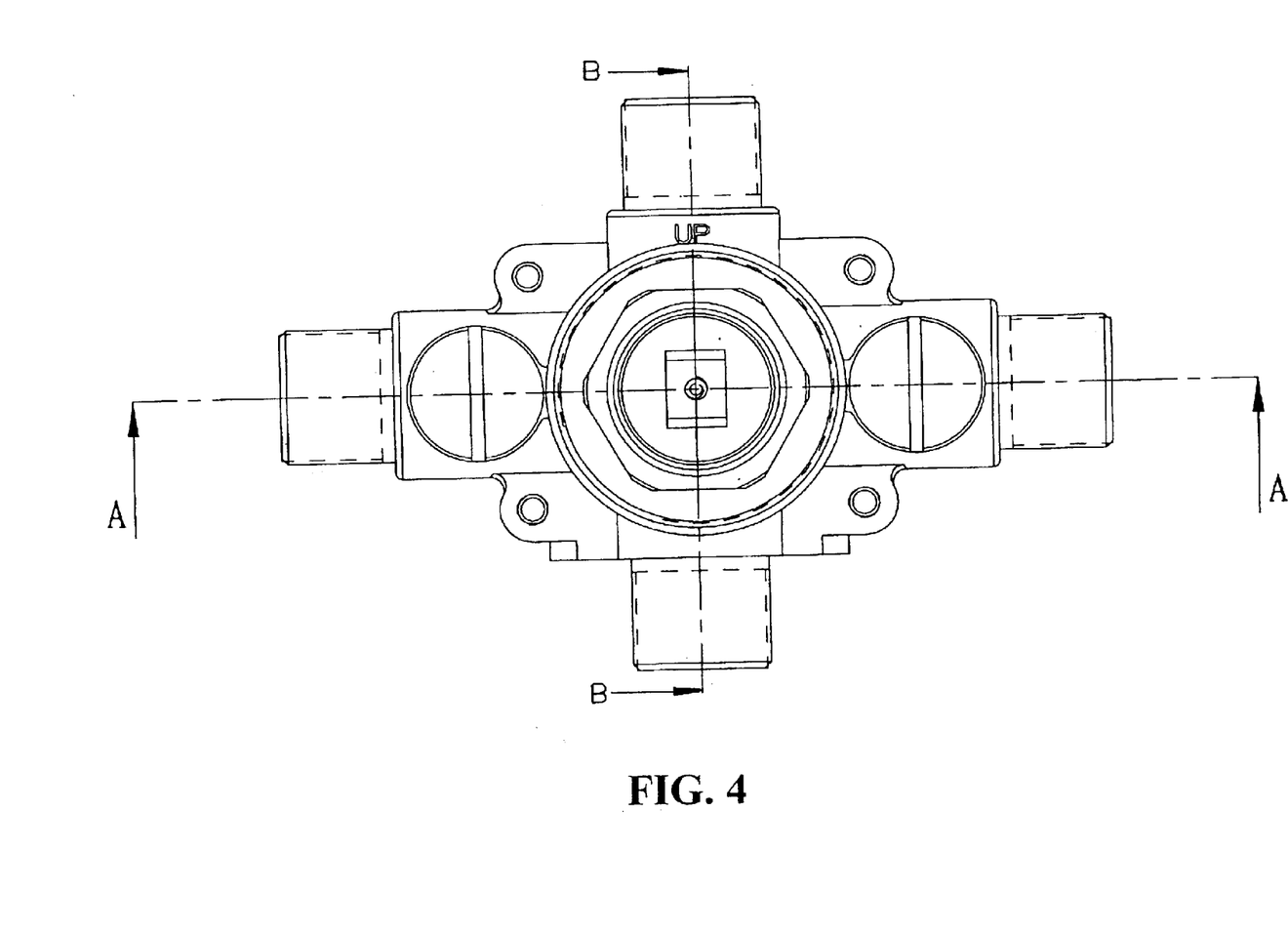
FIG. 4 is a top view of the preferred embodiment of the present invention.
Figure 5:
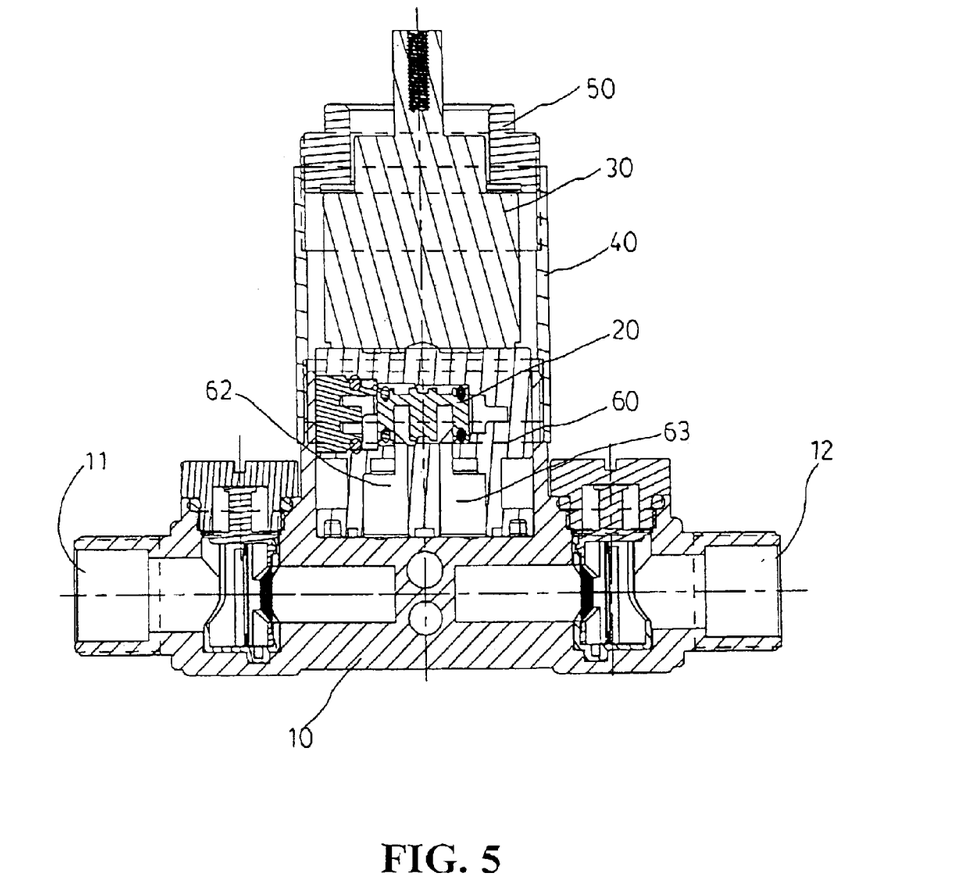
FIG. 5 is a sectional view of the preferred embodiment of the present invention.
Figure 6:
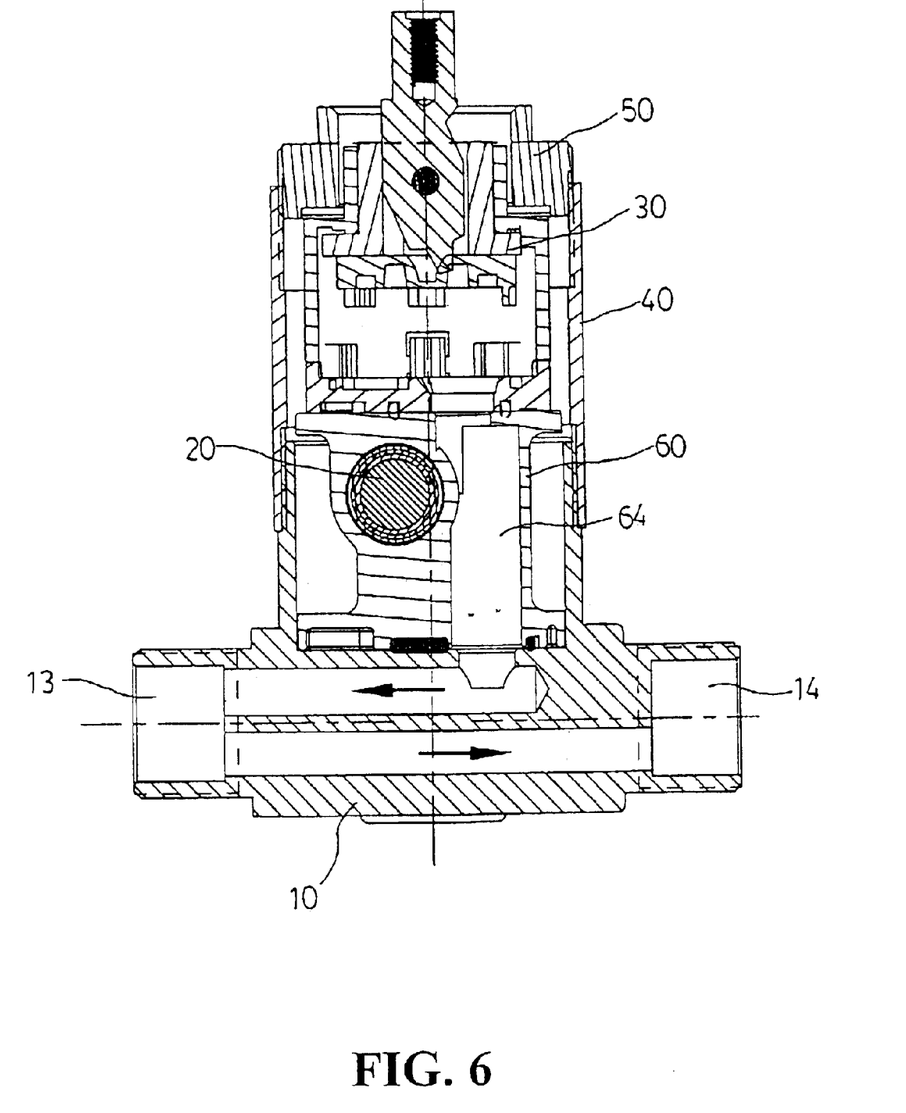
FIG. 6 is another sectional view of the preferred embodiment of the present invention.
Figure 7A:
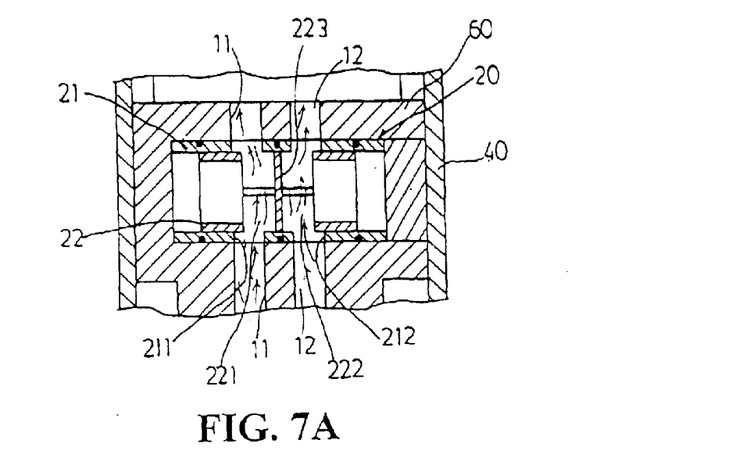
FIG. 7 is a schematic view showing the operation of a balance valve in the preferred embodiment of the present invention.
Figure 7B:
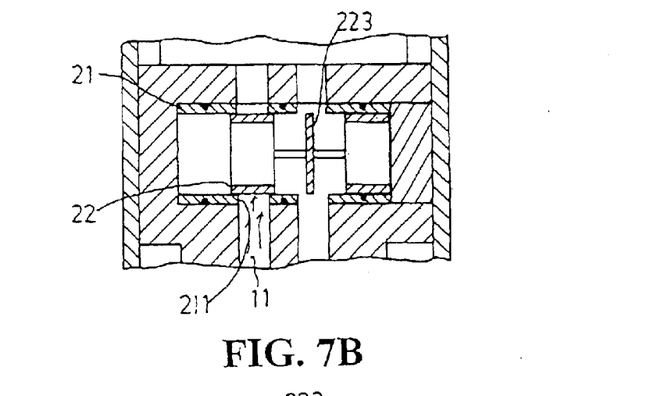
Figure 7C:
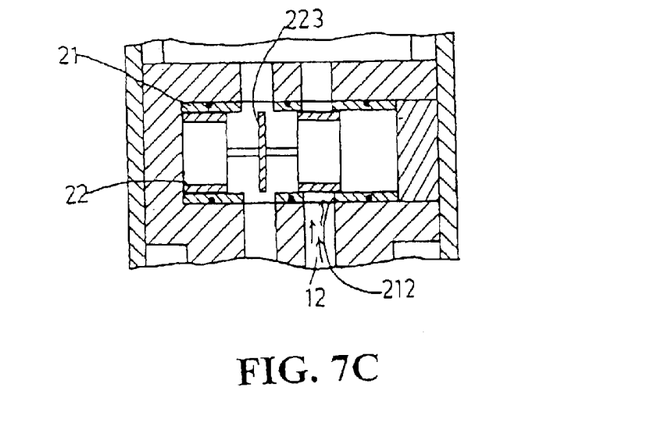

The shower bath tap as described above is characterized by that both cold and hot water, before entering into a valve body 10, pass through a balance valve 20 and a cartridge 30 where both cold and hot water are properly mixed and delivered through the water outlet 13. Both the cartridge 30 and the balance valve 20 are members of the prior art in their configuration as illustrated in FIGS. 3, 5, and 6. The operation of the balance valve 20 is illustrated in FIG. 7, wherein, both cold and hot water from the water supply lines flow respectively through the cold and hot water tubes 11, 12 of the valve body 10 into the balance valve 20. As illustrated in FIG. 7A, a mobile part 22 of the balance valve 20 remains at the center for being subject to the equal pressure from the cold water and the hot water if the amount delivered of both cold and hot water are equal for both cold and hot water to flow to the balance valve 20 through a left water way 221 and a right water way 222. As illustrated in FIG. 7B, when only cold water is supplied t rough the cold water inlet 11, water current pressure is applied through the left water way 221 of the mobile part 22 on a separation plate 223 to move the mobile part 2 to its right, thus to block a left water pore 211 of a fixed part 21 to prevent the cold water from being delivered. On the contrary, if only hot water is supplied through the cold water inlet 12 as illustrated in FIG. 7C, water current pressure is applied, the mobile part 22 is moved to its left to block a right water pore 212 of a fixed part 21 to prevent the hot water from being delivered. Referring to FIG. 6, both cold and hot water flowing through the balance valve and entering into the cartridge 30 are mixed in the cartridge 30 and the mixing ratio is controlled by turning the handle 3 before allowing the mixed water to be delivered through the water outlet 13. This type of shower bath tap is known for its advantage of giving a very accurate regulation and control of the temperature of the water delivered through the balance valve and the cartridge. However, the mechanism of the cartridge may be of a general one or a precision ceramic one, arid the configuration of the balance valve varies depending on which one is used. Accordingly, various types of valve body must be designed to cope with the cartridge and the balance valve for assembly, resulting in higher production and assembly costs due to inconsistent structures among the members.

SUMMARY OF THE INVENTION

The primary purpose of the present invention is to provide a shower bath tap assembly housing a cylindrical balance valve seat to accommodate a balance valve that can be directly placed in a central trough of the valve body and adapted to a general or a ceramic cartridge in achieving the standardized specification for the tap valve assembly for production and assembly costs reduction.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in anyway. Rather, the following description provides a convenient illustration for implementing exemplary embodiments of the invention. Various changes to the described embodiments may be made in the function and arrangement of the elements described without departing from the scope of the invention as set forth in the appended claims.

Figure 8:
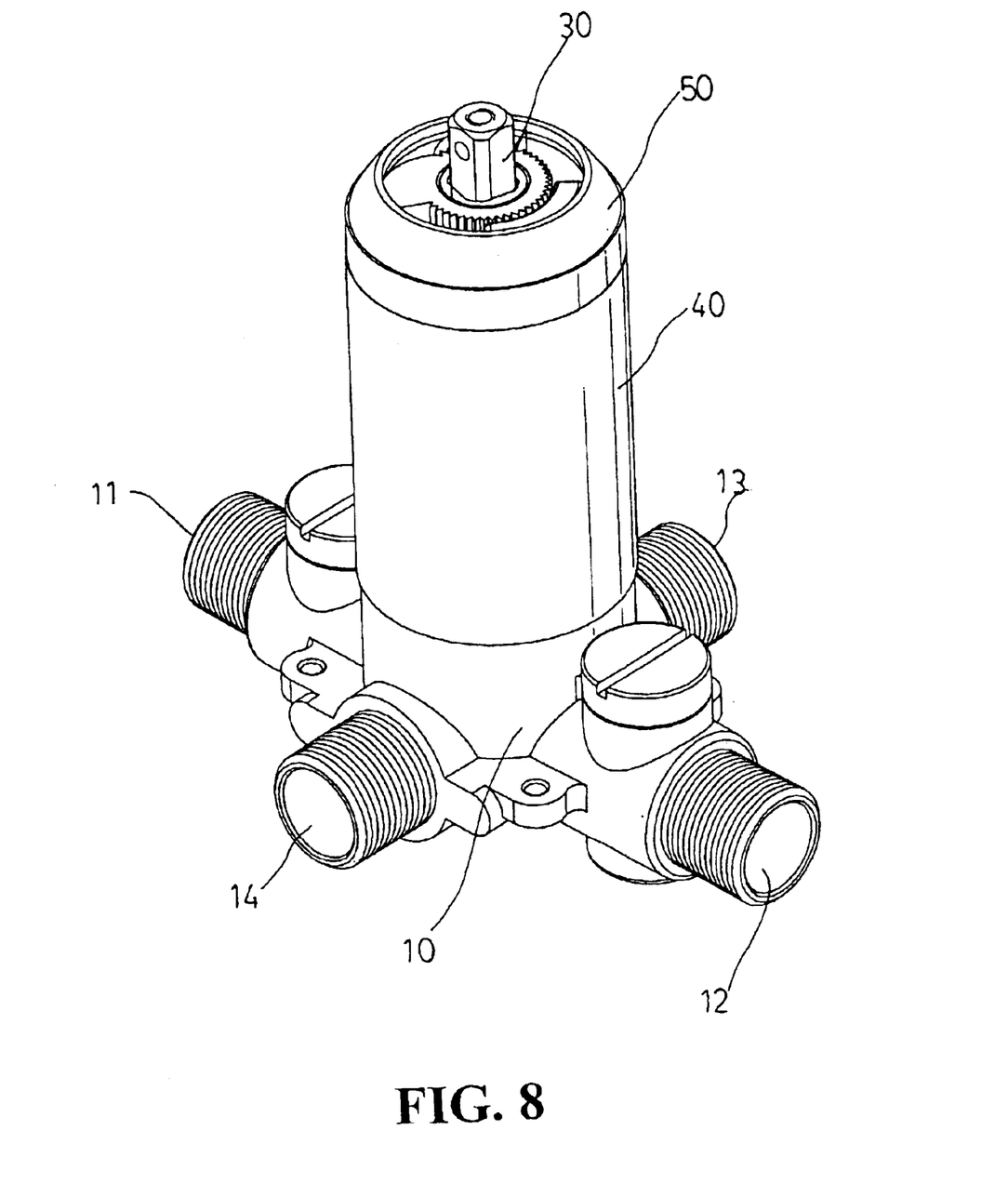
FIG. 8 is a view showing the appearance of the preferred embodiment of the present invention.
Figure 9:
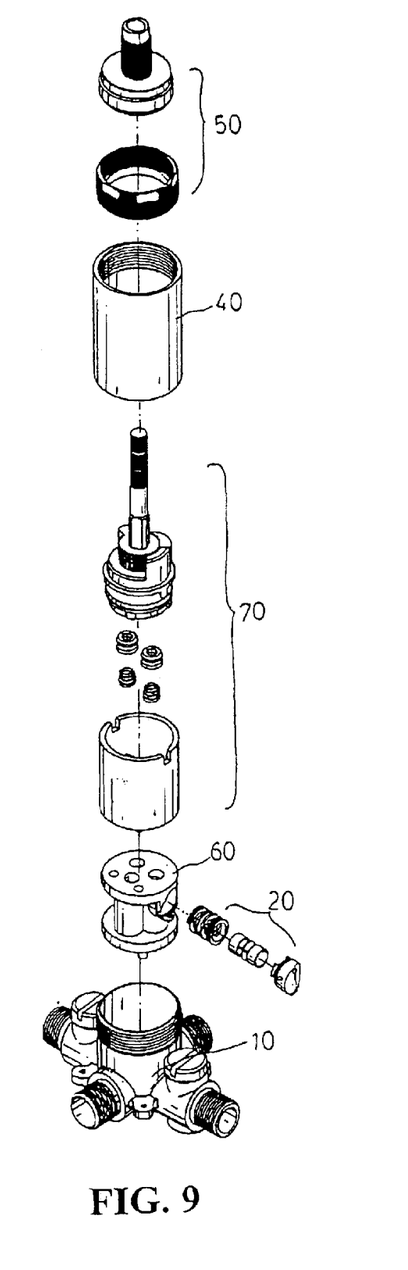
FIG. 9 is an exploded view of the preferred embodiment of the present invention.

Referring to FIGS. 2, 3, 4, 5, 6, 7A, 7B, and 7C, a preferred embodiment of the present invention is comprised of a valve body 10, a balance valve 20, a ceramic cartridge 30, a sleeve 40, a fixation nut 50 and a balance valve seat 60. Wherein, the valve body 10 is provided with a cold water inlet 11, a hot water inlet 12, a water outlet 13 and a drain 14 all connected through a central trough 15 of the valve body 10. The balance valve seat 60 has an outer diameter which is the same as an inner diameter of the central trough 15 and is directly placed in the central trough 15. An accommodation trough 61 is provided on one side of the balance valve seat 60 to receive the balance valve 20 (a member of the prior art) comprised of a fixed part 21 and a movable part 22; a cold waterway 62, a hot water way 63 and a water outlet way 64 are provided on the end surface of the balance valve seat 60 with both of the cold and hot water ways 62, 63 being connected through the accommodation trough 61. The ceramic cartridge 30, also a member of the prior art, is provided at its bottom with a cold water inlet, a hot water inlet and a water outlet and contains a current mixing mechanism; and rod extending from its top being connected to a handle to directly have the ceramic cartridge 30 mounted on the balance valve seat 60, covered with the sleeve 40 and secured in the central trough 15 of the valve 10. Furthermore, the fixation nut 50 is screwed to the central trough 15 of the valve body 10 before being screwed to the other end of the sleeve to complete the assembly of the entire valve body. Wherein, both of the cold and hot water ways 62, 63 of the balance valve seat 60 are respectively connected at their lower ends to both of the cold d hot water inlets 11, 12 of the valve body while their upper ends are respectively connected to cold and hot water inlets of the ceramic cartridge 30. The water outlet way 64 of the balance valve seat 60 is connected at its top to the water outlet of the ceramic cartridge 30 and its lower end, to the water outlet 13 of the valve body 10 so that cold and hot water have to first flow through the balance valve seat 60 to undergo regulation and control of closing or opening the cold and hot water ways of the balance valve 20 (in a way in consistency to the prior art) before entering into cold and hot water inlets of the valve body 10 where both cold and hot water are mixed at a proper ratio by turning the handle and delivered to the water outlet 13 of the valve body 10 through the water outlet way 64 of the balance valve seat 60. Furthermore, as illustrated in FIGS. 8 and 9, the specification of the valve body 10 can be standardized due to the installation of the balance valve seat 60 of the present invention, thus is also applicable for the assembly with a general cartridge.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A shower bath tap valve assembly comprising a valve body, a balance valve, a ceramic cartridge, a sleeve, a fixation nut and a balance valve seat, wherein the valve body is provided with a cold water inlet, a hot water inlet, a water outlet and a drain all connected through a central trough of the valve body, the balance valve seat has an outer diameter which is the same as an inner diameter of the central trough and is directly placed in the central trough, an accommodation trough is provided on one side of the balance valve seat to receive the balance valve comprised of a fixed part and a movable part, a cold water way, a hot water way and a water outlet way are provided on an end surface of the balance valve at with the cold and hot water ways connected through the accommodation trough, the ceramic cartridge is provided at a bottom with a cold water inlet, a hot water inlet and a water outlet and contains a current mixing mechanism, the fixation nut is screwed to the central trough of the valve body, lower ends of the cold and hot water ways of the balance valve seat are respectively connected to the cold and hot water inlets of the valve body, upper ends of the cold and hot water ways of the balance valve seat are respectively connected to the cold and hot water inlets of the ceramic cartridge, an upper end of the water outlet way of the balance valve is connected to the water outlet of the ceramic cartridge, a lower end of the water outlet way of the balance valve is connected to the water outlet of the valve body, whereby cold and hot water must first flow through the balance valve seat to undergo regulation and control of closing or opening the cold and hot water ways of the balance valve before entering into cold and hot water inlets of the valve body where the cold and hot water are mixed at a predetermined ratio and delivered to the water outlet of the valve body through the water outlet way of the balance valve seat.

* * * * *